United States Patent
Cwalina

(10) Patent No.: US 10,007,551 B2
(45) Date of Patent: *Jun. 26, 2018

(54) TECHNIQUES FOR SWITCHING THREADS WITHIN ROUTINES

(71) Applicant: Microsoft Technology Licensing, LLC, Redmond, WA (US)

(72) Inventor: Krzysztof Cwalina, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/059,278

(22) Filed: Oct. 21, 2013

(65) Prior Publication Data

US 2014/0047446 A1 Feb. 13, 2014

Related U.S. Application Data

(63) Continuation of application No. 11/977,593, filed on Oct. 25, 2007, now Pat. No. 8,589,925.

(51) Int. Cl.
*G06F 9/46* (2006.01)
*G06F 9/48* (2006.01)
(Continued)

(52) U.S. Cl.
CPC .......... *G06F 9/4806* (2013.01); *G06F 9/4484* (2018.02); *G06F 9/46* (2013.01);
(Continued)

(58) Field of Classification Search
None
See application file for complete search history.

(56) References Cited

U.S. PATENT DOCUMENTS 5,261,097 A * 11/1993 Saxon .......................... 718/106
5,276,879 A * 1/1994 Barry et al. ................... 718/106
(Continued)

FOREIGN PATENT DOCUMENTS

JP 03-172938 7/1991
JP 03-173938 7/1991
(Continued)

OTHER PUBLICATIONS

Kumar et al, "Asynchronous Software Thread Integration for Efficient Software Implementations of Embedded Communication Protocol Controllers", LCTES'04, Jun. 11-13, 2004, ACM, pp. 1-10.*
(Continued)

*Primary Examiner* — Charles M Swift
(74) *Attorney, Agent, or Firm* — Dicke, Billig & Czaja, PLLC

(57) ABSTRACT

Various technologies and techniques are disclosed for switching threads within routines. A controller routine receives a request from an originating routine to execute a coroutine, and executes the coroutine on an initial thread. The controller routine receives a response back from the coroutine when the coroutine exits based upon a return statement. Upon return, the coroutine indicates a subsequent thread that the coroutine should be executed on when the coroutine is executed a subsequent time. The controller routine executes the coroutine the subsequent time on the subsequent thread. The coroutine picks up execution at a line of code following the return statement. Multiple return statements can be included in the coroutine, and the threads can be switched multiple times using this same approach. Graphical user interface logic and worker thread logic can be co-mingled into a single routine.

18 Claims, 9 Drawing Sheets

(51) Int. Cl.
*G06F 9/50* (2006.01)
*G06F 9/448* (2018.01)

(52) U.S. Cl.
CPC ............... *G06F 9/461* (2013.01); *G06F 9/48* (2013.01); *G06F 9/485* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5011* (2013.01); *G06F 9/5022* (2013.01); *G06F 9/5027* (2013.01); *G06F 9/5038* (2013.01)

(56) References Cited

U.S. PATENT DOCUMENTS

| | | | | |
|---|---|---|---|---|
| 6,598,068 | B1* | 7/2003 | Clark | 718/104 |
| 6,904,597 | B2 | 6/2005 | Jin et al. | |
| 6,954,933 | B2* | 10/2005 | Stall | 719/314 |
| 6,978,423 | B2 | 12/2005 | Seetharaman et al. | |
| 7,007,244 | B2 | 2/2006 | Pankovcin | |
| 7,043,725 | B1* | 5/2006 | Krishnan et al. | 718/1 |
| 8,589,925 | B2 | 11/2013 | Cwalina | |
| 2003/0005029 | A1* | 1/2003 | Shavit et al. | 709/107 |
| 2003/0041139 | A1 | 2/2003 | Beadles et al. | |
| 2003/0163508 | A1* | 8/2003 | Goodman | 709/100 |
| 2005/0034024 | A1* | 2/2005 | Alverson et al. | 714/38 |
| 2006/0026594 | A1* | 2/2006 | Yoshida et al. | 718/100 |
| 2006/0048106 | A1* | 3/2006 | Citron et al. | 717/136 |
| 2006/0070041 | A1* | 3/2006 | Brumme et al. | 717/131 |
| 2006/0100011 | A1 | 5/2006 | Morrow et al. | |
| 2006/0100986 | A1* | 5/2006 | MacPherson | 707/2 |
| 2006/0156152 | A1* | 7/2006 | Trowbridge et al. | 714/746 |
| 2006/0161739 | A1* | 7/2006 | Genty et al. | 711/152 |
| 2007/0118836 | A1* | 5/2007 | Mensing | 718/102 |
| 2008/0168247 | A1* | 7/2008 | Goodwill et al. | 711/163 |
| 2009/0113436 | A1 | 4/2009 | Cwalina | |

FOREIGN PATENT DOCUMENTS

| | | |
|---|---|---|
| JP | 09-198265 | 7/1997 |
| JP | 2007538323 | 12/2007 |
| TW | 498281 | 8/2002 |

OTHER PUBLICATIONS

"Coroutine", 2003 McGraw-hilll, http://encyclopedia2.thefreedictionary.com/coroutine.*
"Search Report Issued in European Patent Application No. 08842012.0", dated Jun. 23, 2014, Filed Date: Oct. 22, 2008, 8 Pages.
Moura, et al., "Revisiting Coroutines", PUC-Riolnf.MCC15, Jun. 4, 2004, 32 Pages.
Albahari, et al., "Chapter 19: Threading", In Book—C# 3.0 In a Nutshell, 3rd Edition, O'Reilly Publication, Sep. 26, 2007, 52 Pages.
"Office Action and Search Report Issued in Taiwan Patent Application No. 103108713", dated Jun. 10, 2015,10 Pages.
"Smart Client Architecture and Design Guide", http://msdn2.microsoft.com/en-usflibrary/ms998490.aspx.
"Multithreading and Creating new controls", http://www.dotnet247.com/247reference/msgs/53/268421.aspx.
"Implementing Coroutines for .NET by Wrapping the Unmanaged Fiber API", http://msdn.microsoft.com/msdnmag/issues/03/09/CoroutinesinN ET/default.aspx.
"Give Your .NET-based Application a Fast and Responsive UI with Multiple Threads", http://msdn.microsoft.com/library/default.asp?url=/msdnmag/issues/03/02/multithreading/toc.asp.
International Search Report and Written Opinion Received for PCT Application No. PCT/US2008/080825, dated May 15, 2009, 11 pages.
Kumar, "STI Concepts for Bit-Bang Communication Protocols", Master's Thesis at North Carolina State University, D May 2003, 99 pages.
Powell, et al., "SunOS Multi-thread Architecture", Sun Microsystems, Usenix, Dallas, TX, 1991, 14 pages.
The Office Action for U.S. Appl. No. 11/977,593 dated May 23, 2011 (21 pgs.).
The Office Action for U.S. Appl. No. 11/977,593 dated Oct. 31, 2011 (20 pgs.).
The Final Office Action for U.S. Appl. No. 11/977,593 dated Mar. 15, 2012 (19 pgs.).
The Notice of Allowance for U.S. Appl. No. 11/977,593 dated Jul. 17, 2013 (13 pgs.).

* cited by examiner

310

```
public class BetterButton : System.Windows.Forms.Button { public BetterButton() { } public event BackgroundJobHandler Clicked;        — 312 protected override void OnClick(EventArgs e) {
        base.OnClick(e);
        BackgroundJobHandler h = Clicked;
        if (h != null) {
            EXECUTE (h, this,true);        —— 314
        }
    }
}
```

```
private static void  Execute(Tuple<BackgroundJobHandler,
ISynchronizeInvoke> t) {
    IEnumerable<ThreadRequest> workEnumerable = t.value1();
    IEnumerator<ThreadRequest> workEnumerator =
  workEnumerable.GetEnumerator();
    Func<bool> work = workEnumerator.MoveNext;
    bool moreWork = work();
    while (moreWork) {
        ThreadRequest requestedThread =
  workEnumerator.Current;                        ⟵ 324
        if (requestedThread == ThreadRequest.UI) {
            moreWork = BetterThreadPool.InvokeValue
    <bool>(work, t.value2);
        } else {
            moreWork = work();
        }
    }
}
```

FIG. 8

```
public partial class MainForm : Form {

IEnumerable<ThreadRequest> betterButton1_Clicked() {        ⎯ 332
        // this runs on UI thread
        yield return ThreadRequest.UI;                          ⎯ 334
        string input1 = this.inputTextBox.Text;
        this.inputTextBox.Enabled = false;                      ⎯ 336
        this.betterButton1.Enabled = false;

// this runs on a worker thread
        yield return ThreadRequest.Worker;                      ⎯ 338
        string result1 = ExpensiveFunction(input1);             ⎯ 340

// this runs on UI thread
        yield return ThreadRequest.UI;                          ⎯ 342
        this.resultTextBox.Text = result1;
        this.inputTextBox.Enabled = true;                       ⎯ 344
        this.betterButton1.Enabled = true;
    } private string ExpensiveFunction(string input) {
        System.Threading.Thread.Sleep(5000);
        return input.Replace(input[0], '#');
    }
}
```

FIG. 9

TECHNIQUES FOR SWITCHING THREADS WITHIN ROUTINES

CROSS-REFERENCE TO RELATED APPLICATIONS

This application is a continuation of U.S. patent application Ser. No. 11/977,593, filed Oct. 25, 2007, entitled "TECHNIQUES FOR SWITCHING THREADS WITHIN ROUTINES," which is incorporated herein by reference in its entirety.

BACKGROUND

Developers write software applications using one or more software development programs. Developers write source code that is needed to make the software application perform the desired functionality. Software applications that have a user interface allow an end user to interact with graphical menus and options in the completed application to achieve a desired result. Source code generally has to be written by developers during development of the software application to handle such user input, and then to perform the proper work in response to the user input.

For example, in the case of a completed customer service application, the end user might be able to select a search operation to search for all customer records for a given customer name. The software application would then have to process the search, access a database to find the matching records, and return the results to the end user. If such a search is processed on the user interface thread of the software application, then an hourglass may or may not be displayed depending on the status of the processing. For example, an hourglass may not be displayed if the application is completely blocked. In such a blocking scenario, all that may be displayed on the screen is a black rectangle or other indicator which designates that the user interface thread is blocked. During this blocked period, the user is not able to do anything else with the program since the user interface thread is totally occupied in the performance of the search.

As technology has advanced, multi-threaded applications and multi-processor computers can now be utilized. In other words, multiple threads of execution can be started at the same time, sometimes on multiple processors when available. One thread, for example, may be used to handle user input, and another thread may be used for performing worker tasks. In order to create multi-threaded applications, developers are challenged with writing complex source code that creates and manages the multiple threads. This source code typically needs to include functionality for passing arguments between the different threads, which may be running asynchronously over many different locations. Developers often write separate routines for the work that needs performed by separate threads. Due to the complexity of working with multiple threads, it is common for developers to use the multiple threads incorrectly or inefficiently, or to not even use multiple threads at all and just expect that users will be fine with infrequent user interface blocks.

SUMMARY

Various technologies and techniques are disclosed for switching threads within routines. A controller routine receives a request from an originating routine to execute a coroutine, and executes the coroutine on an initial thread. The controller routine receives a response back from the coroutine when the coroutine exits based upon a return statement. A subsequent thread is indicated that the coroutine should be executed on when the coroutine is executed a subsequent time. The controller routine executes the coroutine the subsequent time on the subsequent thread that was previously indicated. Multiple return statements can be included in the coroutine, and these steps can be repeated multiple times to switch threads.

In one implementation, execution of graphical user interface logic and worker thread logic can be co-mingled into a single coroutine. Code execution starts for initial logic contained in a coroutine, with the initial logic being executed on a first thread to receive user input. The user input is then received. The coroutine returns partially through to switch to a second thread, with the second thread being a different thread than the first thread. Code execution resumes in the coroutine on the second thread to perform work in response to the user input.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 illustrates exemplary source code for an OnClick event associated with a form of a user interface to show an example of how a controller routine is started.

FIG. 8 illustrates exemplary source code for a controller routine that manages the execution of a coroutine on multiple threads.

FIG. 9 illustrates exemplary source code for a coroutine that co-mingles graphical user interface logic and worker thread logic into a single coroutine.

DETAILED DESCRIPTION

The technologies and techniques herein may be described in the general context as techniques that enable switching between threads within a single routine, but the technologies and techniques also serve other purposes in addition to these. In one implementation, one or more of the techniques described herein can be implemented as features within a software development program such as MICROSOFT® VISUAL STUDIO®, from any type of program or service that is used to write source code for a software application, or from any other type of program or service that is used to create or manage multi-threaded software applications.

Figure 1:
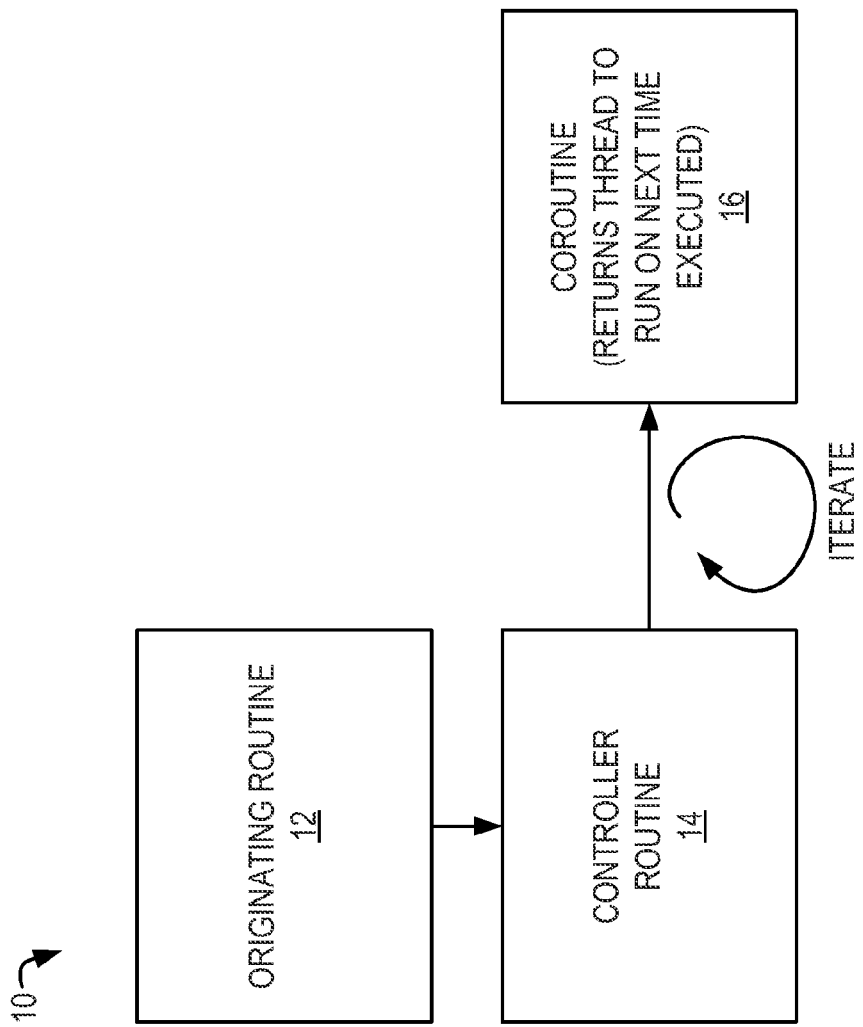
FIG. 1 is a diagrammatic view of a thread switching system of one implementation.

In one implementation, coroutines can be used with some or all of the technologies and techniques described herein to enable code to be written that appears to be sequential and passes arguments with a regular language syntax, but that also allows for switching between multiple threads that execute the logic contained in the single routine. In other words, the technologies and techniques described herein provide mechanisms for co-mingling the usage of logic that is to be executed on different threads within a same routine. The term "coroutine" as used herein is meant to include a function, procedure, or other routine that contains a set of code statements that are co-located within the coroutine and allows multiple entry points that can be suspended and resumed at later times, with the lifetime of a particular activation record of the coroutine being independent of the time when control enters or leaves the coroutine FIG. 1 is a diagrammatic view of a thread switching system 10 of one implementation. In one implementation, thread switching system 10 includes an originating routine 12, a controller routine 14, and a coroutine 16. The term "routine" as used herein is meant to include a program component, including a function, procedure, or any other manner of grouping source code into a unit. An originating routine 12 can be any routine that wants to execute functionality that is contained in a given coroutine, such as coroutine 16. In one implementation, in order to call the coroutine, the originating routine goes through a controller routine 14. The controller routine 14 iteratively calls the coroutine 16 multiple times, each time starting the coroutine 16 on a thread that was indicated by the coroutine when the coroutine returned. The term "return statement" as used herein is meant to include a statement or other mechanism for causing a coroutine to return before an end of the coroutine is reached. In other words, when the coroutine 16 wishes to switch threads before executing any more lines of code, the return statement is used to return from the routine temporarily so a different thread can be used to process the lines of code that follow. There are various ways that the coroutine can indicate the subsequent thread upon returning. In one implementation, the return statement can include a return parameter that includes a subsequent thread identifier for the different thread that should be used next. Various other ways for indicating the subsequent thread can also be used, such as by the coroutine calling a method to set the subsequent thread before returning, by setting a property or value in an object with the subsequent thread identifier, by recording the subsequent thread identifier to a database, etc.

The coroutine 16 is then resumed (on the different thread) at the line of code following the return statement (one or more lines later), or at another suitable location. The stages can be repeated until the end of the coroutine 16 is reached, or another event happens that causes the controller routine 14 to stop iterating through execution of the coroutine 16 and switching threads. In one implementation, each time the coroutine 16 is resumed by the controller routine 14, a most recent subsequent thread that was indicated in a most recent return from the coroutine can be used to determine the thread to use.

It should be noted that in another implementation, the functionality of the originating routine 12 and the controller routine 14 can be combined into the same routine. In some implementations, the term "routine" as used herein can also include coroutines. For example, while originating routine 12 and controller routine 14 are both described as routines, in some implementations, either or both could be implemented as one or more coroutines. These techniques introduced in the discussion of FIG. 1 will be described in much greater detail in FIGS. 3-6, and then with source code examples in FIGS. 7-9.

Figure 2:
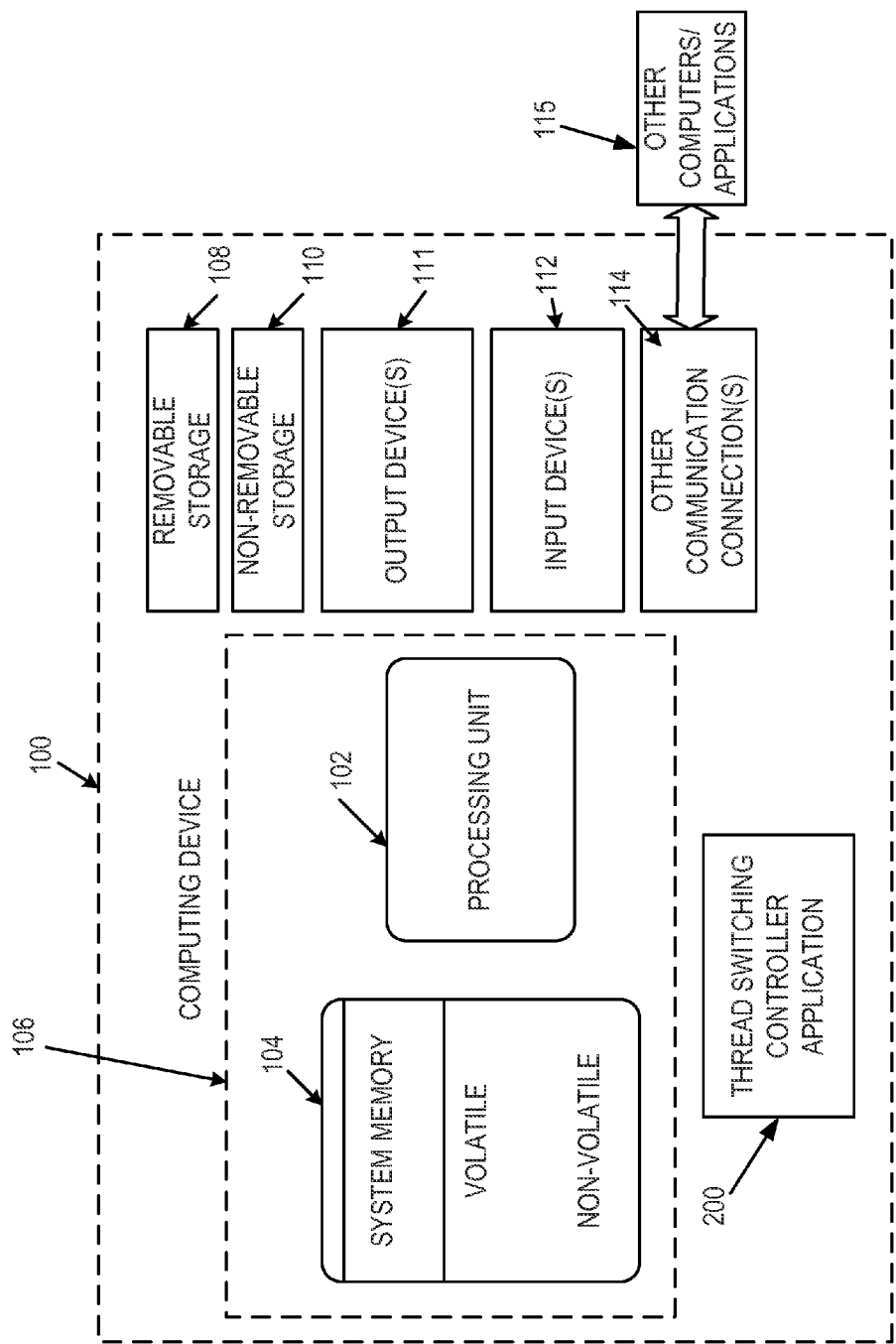
FIG. 2 is a diagrammatic view of a computer system of one implementation.

Turning now to FIG. 2, an exemplary computer system to use for implementing one or more parts of the system is shown that includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes thread switching controller application 200. Thread switching controller application 200 will be described in further detail in FIG. 3.

Figure 3:
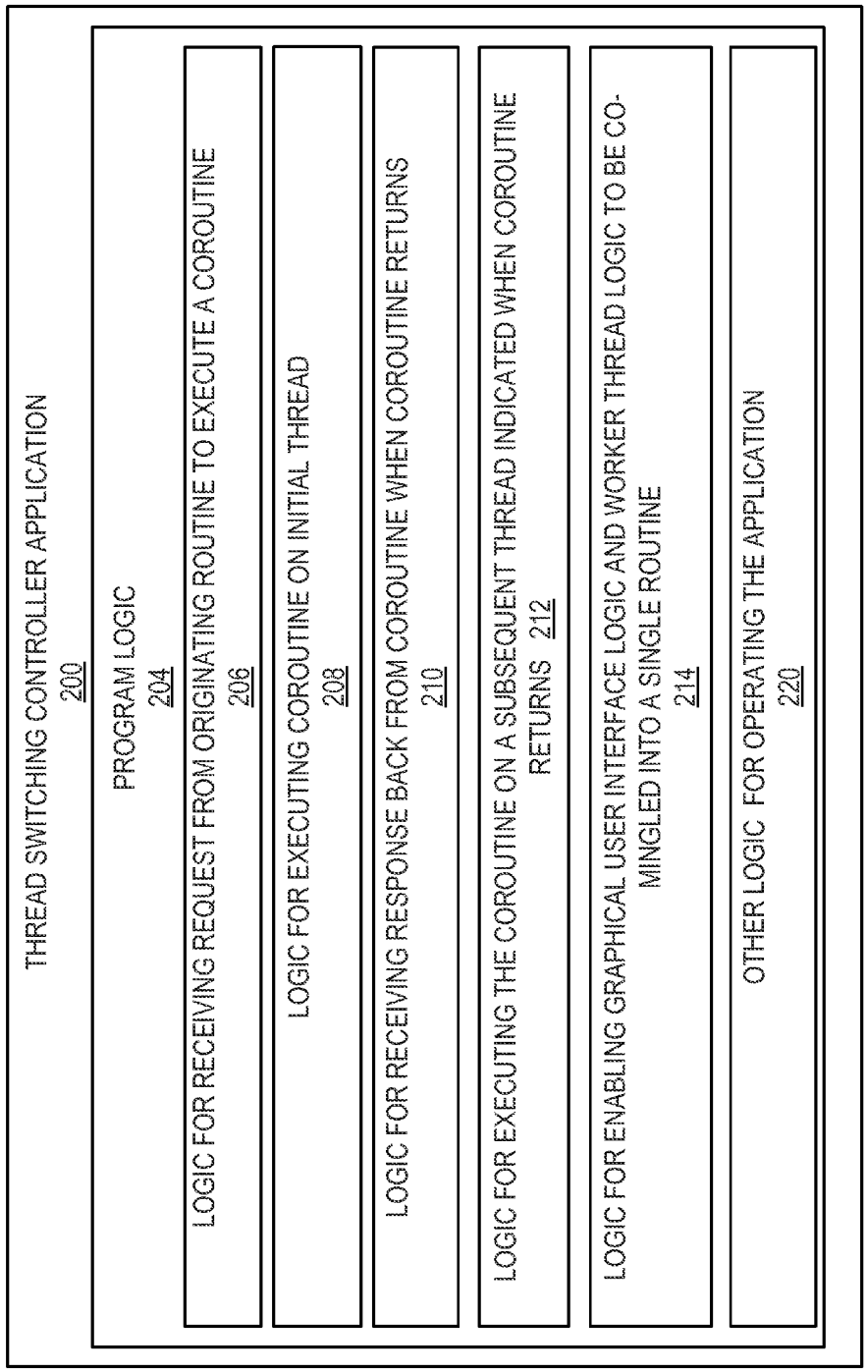
FIG. 3 is a diagrammatic view of a thread switching controller application of one implementation.

Turning now to FIG. 3 with continued reference to FIG. 2, a thread switching controller application 200 operating on computing device 100 is illustrated. Thread switching controller application 200 is one of the application programs that reside on computing device 100. However, it will be understood that thread switching controller application 200 can alternatively or additionally be embodied as computer-executable instructions on one or more computers and/or in different variations than shown on FIG. 2. Alternatively or additionally, one or more parts of thread switching controller application 200 can be part of system memory 104, on other computers and/or applications 115, or other such variations as would occur to one in the computer software art.

Thread switching controller application 200 includes program logic 204, which is responsible for carrying out some or all of the techniques described herein. Program logic 204 includes logic for receiving a request from the originating routine to execute a coroutine 206 (as described below with respect to FIG. 4); logic for executing the coroutine on an initial thread 208 (as described below with respect to FIG. 4); logic for receiving a response back from the coroutine when the coroutine returns 210 (as described below with respect to FIG. 4); logic for executing the coroutine on a subsequent thread indicated when the coroutine returned 212 (as described below with respect to FIG. 4); logic for enabling graphical user interface logic and worker thread logic to be co-mingled into a single routine 214 (as described below with respect to FIG. 6); and other logic 220 for operating the thread switching controller application 200.

Figure 4:
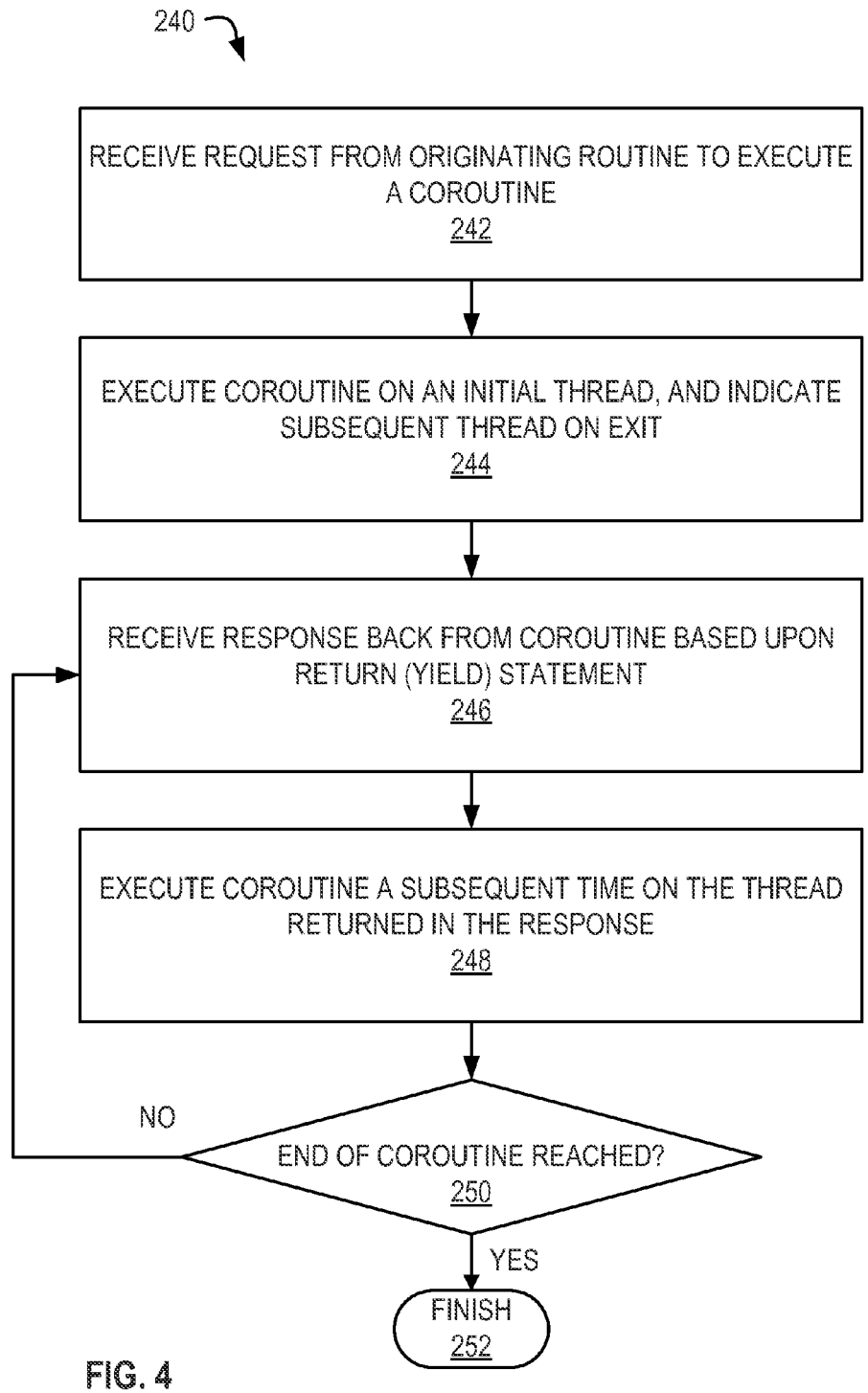
FIG. 4 is a process flow diagram for one implementation illustrating the stages involved in using a controller routine to manage execution of a coroutine on different threads.
Figure 5:
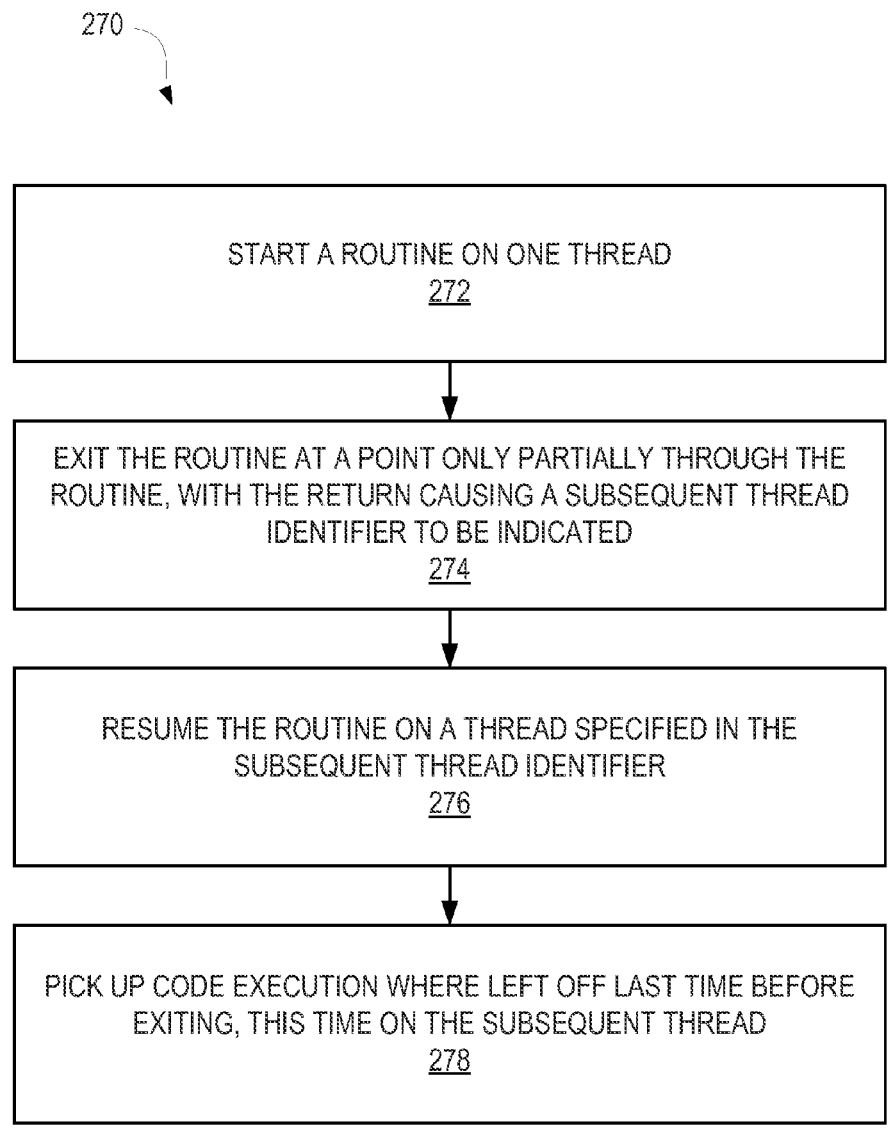
FIG. 5 is a process flow diagram for one implementation illustrating the stages involved in switching threads partially through a routine.
Figure 6:
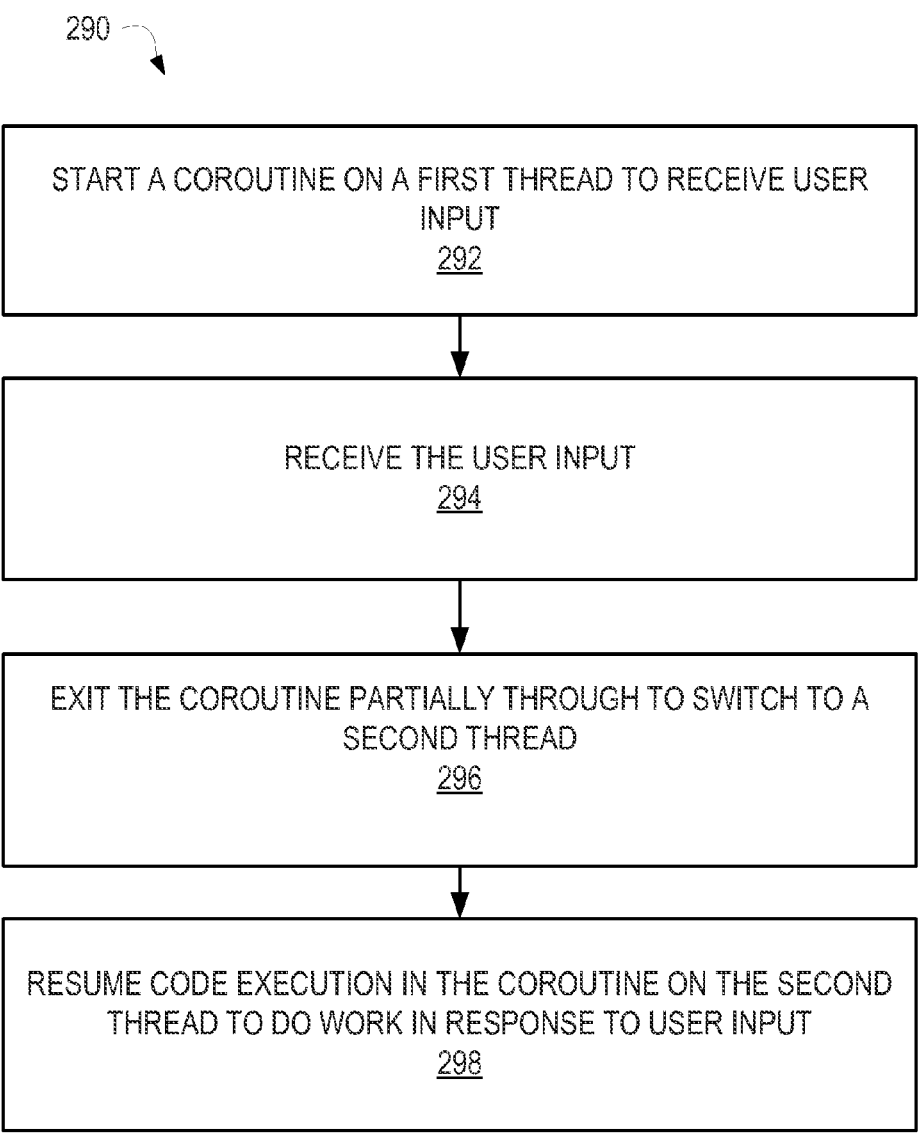
FIG. 6 is a process flow diagram for one implementation illustrating the stages involved in enabling graphical user interface logic and worker thread logic to be co-mingled into a single routine.

Turning now to FIGS. 4-6 with continued reference to FIGS. 1-3, the stages for implementing one or more implementations of thread switching system 10 (of FIG. 1) and/or thread switching controller application 200 (of FIG. 3) are described in further detail. In some implementations, the processes of FIG. 4-6 are at least partially implemented in the operating logic of computing device 100.

FIG. 4 is a process flow diagram 240 that illustrates one implementation of the stages involved in using controller routine to manage execution of a coroutine on different threads. In general, FIG. 4 describes an exemplary process involved in having the controller routine call the coroutine multiple times, each time calling the coroutine on a thread that was specified when the coroutine returned based upon a return statement.

When a request is received from an originating routine to execute a coroutine (stage 242), the controller routine executes the coroutine on an initial thread (stage 244). In one implementation, before a line of code is encountered in the coroutine to initiate the switching to a desired thread, the initial thread will simply be a default thread that is used by the software application when a thread is not otherwise specified. The coroutine then executes some logic, and the controller routine receives a response back from the coroutine based upon a return statement (stage 246). Upon exit, the coroutine had indicated a subsequent thread identifier to specify what thread the coroutine should be called on the next time the controller routine calls the coroutine. In one implementation, the response received back from the coroutine from the return statement contains a parameter with the subsequent thread identifier. In other implementations, the controller routine accesses the value in an object, database, or other variable that was assigned the subsequent thread identifier when the coroutine returned.

The controller routine then executes the coroutine a subsequent time on the thread that was indicated when the coroutine returned (i.e. indicated in the subsequent thread identifier) (stage 248). If the coroutine returns again before the end of the coroutine is reached (i.e. because of another return statement) (decision point 250), then the controller routine will receive another response back from the coroutine and will have an indication of the next subsequent thread to start the coroutine on the next time it is called (stage 246). The controller routine will then execute the coroutine again on the next subsequent thread (stage 248). Once the end of the coroutine is reached (decision point 250), the controller routine stops calling the coroutine (stage 252).

FIG. 5 is a process flow diagram 270 that illustrates one implementation of the stages involved switching threads partially through a routine. The routine is started on one thread (stage 272). In one implementation, the routine is a coroutine. In another implementation, the routine is any type of routine that can be called multiple times, and that is operable to have execution started at a point in the code where the prior execution stopped. After executing one or more lines of code in the routine, the routine encounters a return statement, thereby causing the routine to return at a point only partially through all the code in the routine (stage 274). Upon returning, the routine causes a subsequent thread identifier to be indicated (stage 274). There are various ways that the routine can cause the subsequent thread identifier to be indicated, such as in a return parameter of the return statement itself, by setting a property or field of an object or type to set the value, by calling a method that sets the value, by writing the subsequent thread identifier to a database, or through any other means of communicating the subsequent thread identifier to the controller routine. Execution of the routine is then resumed on the thread that was specified in the subsequent thread identifier (stage 276). Code execution is picked up where it left off the last time before return, this time on the subsequent thread (stage 278).

FIG. 6 is a process flow diagram 290 that illustrates one implementation of the stages involved in enabling graphical user interface thread logic and worker thread logic to be co-mingled into a single routine. A coroutine is started on a first thread to receive user input (stage 292). The user input is then received (stage 294). The coroutine returns partially through to switch to a second thread (stage 296), with the second thread being different than the first thread. In one implementation, the coroutine returns because it encountered a return statement. Code execution is resumed in the coroutine on the second thread to do work in response to the user input (stage 298). In one implementation, the first thread is a graphical user interface thread, and the second thread is a worker thread. Various thread combinations are possible, instead of or in addition to graphical user interface threads and/or worker threads. FIG. 9 shows exemplary source code of co-mingling graphical user interface thread logic and worker thread logic into the same routine.

Turning now to FIGS. 7-9, exemplary source code will be described to illustrate the stages of FIGS. 4-6 in further detail. Beginning with FIG. 7, exemplary source code 310 is shown for an OnClick event 312 associated with a form of a user interface. The OnClick event 312 (originating routine 12 on FIG. 1) fires when an end user clicks the BetterButton button on the form. The OnClick event 312 then calls the controller routine (14 on FIG. 1), which is the execute method 314 in the example shown. In one implementation, the name of the coroutine that needs to be executed by the controller routine is passed as a parameter to the controller routine from the originating routine. The controller routine is then responsible for calling the coroutine multiple times on the proper threads, as is indicated in FIG. 8. In the exemplary controller routine 322 shown in FIG. 8, various lines of source code are included for handling work on multiple threads. Calls to the coroutine are also included within a loop 324, which is responsible for calling the coroutine multiple times. Each time the coroutine is called, the controller routine starts the coroutine on the thread that was specified previously when the coroutine returned.

As shown in FIG. 9, the coroutine can include code that is designed to be executed on different types of threads mixed into a single coroutine. In the exemplary source code 330 of FIG. 9, graphical user interface logic (336 and 344) and worker thread logic (340) are co-mingled together into a single routine, which is the betterButton1_Clicked routine 332 in this example. In order to switch between threads, return statements (334, 338, and 342) are used. In this example, GUI threads and worker threads are used for executing separate parts of work. Furthermore, in this example, the return statement is a yield statement (for the C# programming language). Each return statement (334, 338, and 342) signals that the coroutine should be returned temporarily and then resumed in the thread specified as a parameter to the return statement (e.g. "ThreadRequest.UI"

for the GUI thread, or "ThreadRequest.Worker" for the worker thread). When the controller routine shown in FIG. 8 receives the return response from the coroutine, the execution of the coroutine is then started again by the controller routine, but on the specified thread.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method comprising:
executing an initial portion of a routine on an initial thread;
processing a first return statement that is a yield statement, the processing of the first return statement causing the routine to temporarily exit the routine at an end point of the initial portion;
identifying a subsequent thread different than the initial thread via a subsequent thread identifier included in the return statement, the return statement provided in response to the processing of the initial portion; and
performing a subsequent execution of the routine on the subsequent thread via the first return statement, the subsequent execution executing a subsequent portion of the routine from the end point of the initial portion.

2. The method of claim 1, further comprising receiving a request from an originating routine to execute the routine, wherein the executing of the initial portion of the routine is performed in response to the receiving of the request.

3. The method of claim 1, further comprising receiving a response from the routine after the executing of the initial portion of the routine, wherein the response identifies the subsequent thread.

4. The method of claim 3, further comprising executing the routine a plurality of times until an end of the routine is reached, wherein each execution of the routine is executed on a most recent subsequent thread indicated by the routine upon a most recent response from the routine.

5. The method of claim 3, further comprising specifying the subsequent thread as a parameter to the response.

6. The method of claim 1, further comprising selecting the subsequent thread from a threadpool.

7. The method of claim 1, further comprising using the subsequent thread to facilitate processing graphical user interface logic.

8. The method of claim 1, further comprising using the subsequent thread to facilitate processing worker thread logic.

9. A computer-readable memory storing instructions executable by a computing device to cause the computing device to perform operations comprising:
processing an initial portion of a routine on a first thread;
exiting the routine at an end point of the initial portion, the exiting caused by a processing of a first return statement that is a yield statement;
identifying a subsequent thread different than the first thread via a subsequent thread identifier included in the return statement, the return statement provided in response to the processing of the initial portion; and
performing a subsequent processing of the routine from the end point on the subsequent thread via the first return statement.

10. The computer-readable memory of claim 9, the operations further comprising determining the subsequent thread from a plurality of candidate threads included in a threadpool.

11. The computer-readable memory of claim 9, the operations further comprising specifying the subsequent thread via a parameter returned in response to the processing of the initial portion.

12. The computer-readable memory of claim 9, the operations further comprising implementing the routine as a coroutine.

13. The computer-readable memory of claim 9, the operations further comprising configuring the first thread to perform a different type of operation than the subsequent thread.

14. A system, comprising at least one processor coupled to at least one computer-readable storage medium storing instructions executable by the at least one processor to implement:
executing code corresponding to an initial portion of a routine on a first thread;
exiting the routine temporarily in response to a processing of a first return statement that is a yield statement; and
switching from an execution of the initial portion of the routine on the first thread to a subsequent execution of a subsequent portion of the routine on a second thread via the first return statement, the first thread different than the second thread, the switching comprising identifying the subsequent thread via a parameter included in the return statement, the return statement provided in response to the execution of the initial portion.

15. The system of claim 14, the switching further comprising selecting the subsequent thread from a threadpool.

16. The system of claim 14, the switching comprising performing a plurality of thread switches, each of the plurality of thread switches associated with a corresponding return statement identifying a respective subsequent thread.

17. The system of claim 14, the executing of the code corresponding to the initial portion of the routine performed in response to receiving a request from an originating routine to execute the routine.

18. The system of claim 14, the switching facilitating a co-mingling of graphical user interface logic and worker thread logic in the routine.

* * * * *